United States Patent
Grosman et al.

(10) Patent No.: US 9,229,970 B2
(45) Date of Patent: Jan. 5, 2016

(54) METHODS TO MINIMIZE COMMUNICATION IN A CLUSTER DATABASE SYSTEM

(75) Inventors: Ronen Grosman, Thornhill (CA); Matthew A. Huras, Ajax (CA); Timothy R. Malkemus, Round Rock, TX (US); Keriley K. Romanufa, Scarborough (CA); Aamer Sachedina, Queensville (CA); Kelly W. Schlamb, Richmond Hill (CA); Nickolay V. Tchervenski, Newmarket (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 12/632,750

(22) Filed: Dec. 7, 2009

(65) Prior Publication Data

US 2011/0137874 A1    Jun. 9, 2011

(51) Int. Cl.
G06F 17/00    (2006.01)
G06F 17/30    (2006.01)
G06F 11/14    (2006.01)

(52) U.S. Cl.
CPC .... *G06F 17/30368* (2013.01); *G06F 17/30353* (2013.01); *G06F 17/30377* (2013.01); *G06F 11/1471* (2013.01)

(58) Field of Classification Search
None
See application file for complete search history.

(56) References Cited

U.S. PATENT DOCUMENTS

| | | | |
|---|---|---|---|
| 6,510,421 B1 * | 1/2003 | Ganesh et al. | |
| 6,856,993 B1 | 2/2005 | Verma et al. | |
| 6,981,061 B1 * | 12/2005 | Sakakura | 709/248 |
| 7,260,589 B2 | 8/2007 | Cotner et al. | |
| 7,512,636 B2 | 3/2009 | Verma et al. | |
| 7,739,677 B1 * | 6/2010 | Kekre et al. | 717/168 |
| 8,099,396 B1 * | 1/2012 | Novick et al. | 707/661 |
| 2003/0061537 A1 | 3/2003 | Cha et al. | |
| 2005/0144368 A1 * | 6/2005 | Chung et al. | 711/103 |
| 2006/0041660 A1 | 2/2006 | Bishop et al. | |
| 2006/0218206 A1 | 9/2006 | Bourbonnais et al. | |
| 2007/0239791 A1 * | 10/2007 | Cattell et al. | 707/200 |
| 2008/0120470 A1 * | 5/2008 | Dhamankar et al. | 711/135 |
| 2012/0102265 A1 * | 4/2012 | Cong et al. | 711/103 |
| 2013/0110766 A1 * | 5/2013 | Promhouse et al. | 707/607 |

FOREIGN PATENT DOCUMENTS

EP    0625762 A2    11/1994
WO    WO2009108409 A1    9/2009

* cited by examiner

*Primary Examiner* — Hosain Alam
*Assistant Examiner* — Thu Nga Nguyen
(74) *Attorney, Agent, or Firm* — North Shore Patents, P.C.; Michele Liu Baillie; Lesley A. Leonessa

(57) ABSTRACT

An ordering of operations in log records includes: performing update operations on a database object by a node; writing log records for the update operations into a local buffer by the node, the log records each including a local virtual timestamp; determining that a log flush to write the log records in the local buffer to a persistent storage is to be performed; in response, sending a request from the node to a log flush sequence server for a log flush sequence number; receiving the log flush sequence number by the node; inserting the log flush sequence number into the log records in the local buffer; and performing the log flush to write the log records in the local buffer to the persistent storage, where the log records written to the persistent storage comprises the local virtual timestamps and the log flush sequence number.

20 Claims, 5 Drawing Sheets

Diagram 1

| | Node 1 | Node 2 |
|---|---|---|
| 201 | Transaction Start | |
| 202 | Insert into courses ('csc457', 'computability and complexity') VTS=19 | Transaction Start VTS=1 |
| 203 | | Insert into courses ('csc347', 'data structures'); (VTS=20) |
| 204 | Commit (VTS=20) | Commit (VTS=21) |

Diagram 2

| | Node 1 | Node 2 | Wall clock time |
|---|---|---|---|
| 250 | Transaction Start | | 10:00 |
| 251 | Insert into courses ('csc457', 'computability and complexity') VTS=19 | Transaction Start VTS=1 | 11:00 |
| 252 | | Insert into courses ('keri', '950831400'); (VTS=2) | 12:00 |
| 253 | | Insert into courseStudents ('csc457', 'keri'); (VTS=3) | 13:00 |
| 254 | Other activities on this node causes other increases in this node's VTS | | |
| 255 | Commit VTS = 1000 | | 15:00 |
| 256 | | Commit (VTS = 4) | 16:00 |

FIG. 2

| | Node 1 | Node 2 |
|---|---|---|
| 401 | Transaction Start | |
| 402 | Insert into courses ('csc457', 'computability and complexity')<br>VTS=1 | Transaction Start<br>VTS=1 |
| 403 | | Insert into students ('keri', '950831400');<br>(VTS=2) |
| 404 | Other activities on this node causes other increases in this node's VTS | |
| 405 | Commit VTS = 1000<br>(Flush log (LFS=1, VTS=1000) | |
| 406 | | Insert into courseStudents ('csc457', 'Keri'); (VTS=3) |
| 407 | | Commit<br>(Flush Log (LFS=2, VTS=4) |

FIG. 4

METHODS TO MINIMIZE COMMUNICATION IN A CLUSTER DATABASE SYSTEM

BACKGROUND

In a shared database system, multiple nodes or members modify shared resources, and each node writes logs recording the operations local to the node. These logs can then be used in a recovery operation in the event of a crash of the shared database system. During a recovery operation, the operations recorded in the logs are applied against objects in the last image of the database stored prior to the crash. In order to return the database back to the condition just prior to the crash, these operations must be applied in the order in which they originally occurred. For example, a delete a row operation must be applied after the operation which inserted the row. One approach for ensuring proper ordering utilizes hardware support for a synchronized global clock which puts a global timestamp on every log record. A synchronized global clock requires specialized hardware such as a sysplex timer found on certain mainframe systems. Another approach is a Lamport clock algorithm, where a virtual timestamp (VTS) is exchanged between nodes when nodes naturally communicate with each other.

A shared disk database system using common hardware lacks a sysplex timer, and thus a synchronized global clock approach is not possible. Further, although the Lamport clock algorithm works well for database objects that are shared between nodes, the Lamport clock algorithm does not work well for logically dependent operations that do not share a database object. Thus, both approaches are inadequate for a share database system.

BRIEF SUMMARY

According to one embodiment of the present invention, a method for ordering operations in log records in a shared database system includes: performing one or more update operations on a database object by a node in the shared database system; writing one or more log records for the update operations into a local buffer by the node, the log records each comprising a local virtual timestamp; determining that a log flush to write the log records in the local buffer to a persistent storage is to be performed; in response to determining that the log flush is to be performed, sending a request from the node to a log flush sequence server for a log flush sequence number; receiving the log flush sequence number by the node from the log flush sequence server; inserting the log flush sequence number into the log records in the local buffer; and performing the log flush to write the log records in the local buffer to the persistent storage, wherein the log records written to the persistent storage comprises the local virtual timestamps and the log flush sequence number.

In a further embodiment of the invention, a database recovery process is determined to be performed. In response, a lowest log flush sequence number occurring after the database image was stored is determined; log records in the persistent storage comprising the lowest log flush sequence number are determined, the determined log records comprising the lowest log flush sequence number further comprising associated virtual timestamps; and operations in the log records comprising the lowest log flush sequence number are performed in an order according to the associated virtual timestamps.

Further, a next lowest log flush sequence number is determined; a second set of log records in the persistent storage comprising the next lowest log flush sequence number is determined, the second set of log records further comprising a second set of associated virtual timestamps; and operations in the second set of log records comprising the next lowest log flush sequence number are performed in an order according to the second set of associated virtual timestamps.

System and computer program products corresponding to the above-summarized methods are also described and claimed herein.

BRIEF DESCRIPTION OF THE SEVERAL VIEWS OF THE DRAWINGS

FIG. 2 illustrates an example of the Lamport clock algorithm for two nodes in the shared database system.

FIG. 4 illustrates the example in FIG. 2 using the log flush sequence number.

DETAILED DESCRIPTION

Figure 1:
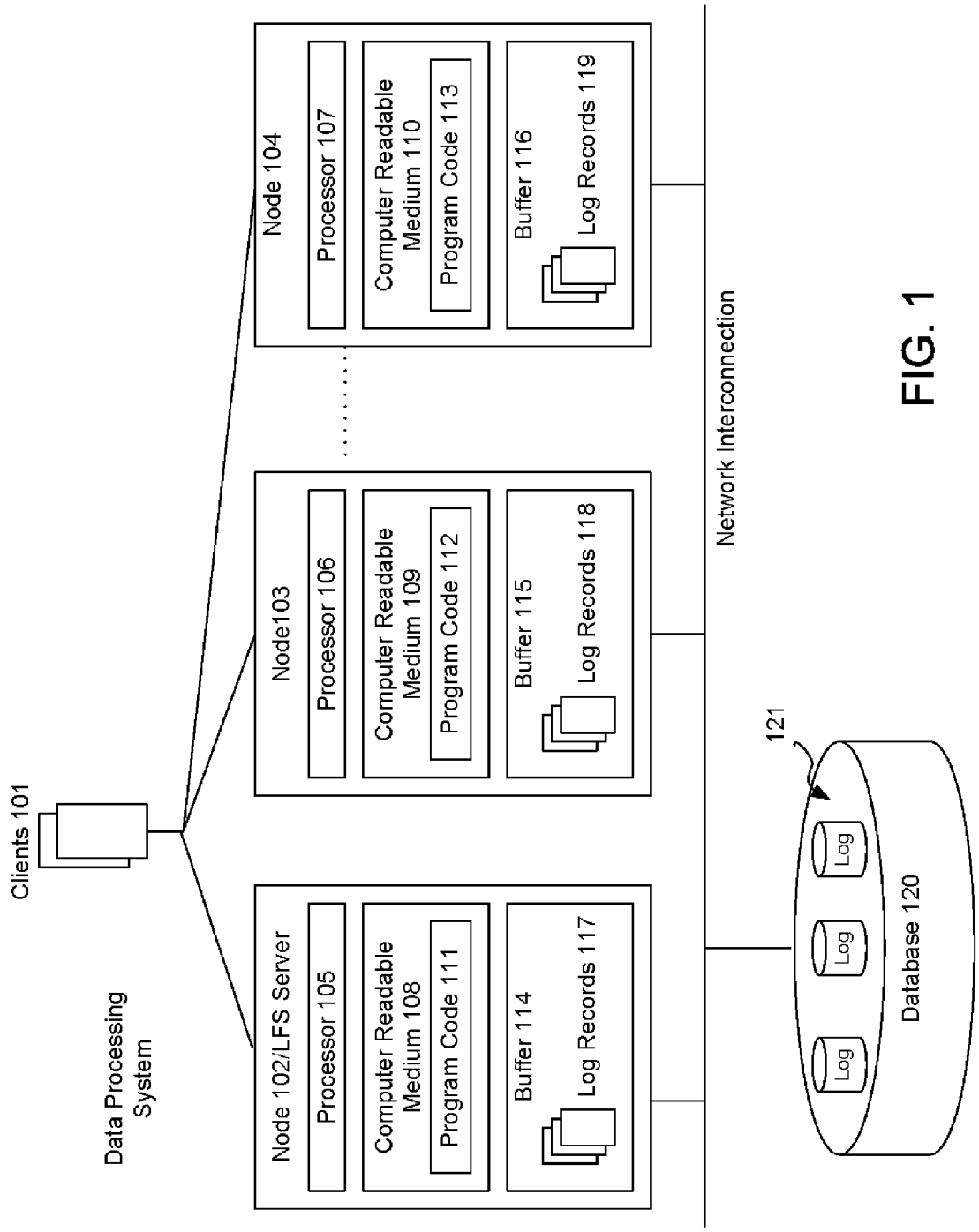
FIG. 1 illustrates an example data processing system utilizing an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an example data processing system utilizing an embodiment of the present invention. The system includes a plurality of clients 101 operatively coupled to a cluster of host computers or nodes 102-104. The nodes 102-104 co-operate with each other to provide coherent shared storage access to the database 120 from any of the nodes 102-104. Data are stored in the database in the form of tables. Each table includes a plurality of pages, and each page includes a plurality of rows or records. The clients 101 can connect to any of the nodes 102-104 and see a single database. Each node 102-104 is operatively coupled to a processor 105-107 and a computer readable medium 108-110. The computer readable medium 108-110 stores computer readable program code 111-113 for implementing the various embodiments of the present invention.

As the node 102-104 performs operations on the rows of the database 120, these operations are recorded locally in log records 117-119 in their respective local buffer 114-116. Periodically, the log records 117-119 are flushed from the local buffers 114-116 to persistent storage 121, i.e., the log records 117-119 in the local buffers 114-116 are written to persistent storage 121 where they are merged with log records from other nodes.

In an embodiment of the present invention, the data processing system uses the Lamport clock algorithm, where a virtual timestamp (VTS) is exchanged between the nodes 102-104 when the nodes 102-104 naturally communicate with each other. Each node 102-104 maintains its own local VTS. Every time a node 102 receives a VTS from another node 103, the node 102 sets its own local VTS to the maximum of its own current local VTS and the received VTS. For example, whenever a copy of a shared object or page is read, the VTS on the object/page is also read, and the node's local VTS is increased to at least this value.

When a node 102 performs an update operation on a page/object, the node 102 writes a log record 117 in its local buffer 114 and includes the local VTS value, plus 1, in the log record 117. The node local VTS value is also incremented. If the page/object is subsequently transferred to another node 103 and updated there, the Lamport clock algorithm will cause the other node 103 to update its own local VTS to at least the value on the object/page. Then, when the node 103 performs the update, and writes a log record 118 into its local buffer 115, the VTS used will be larger than the existing VTS on the page. This ensures that updates to all shared resources are guaranteed to accurately capture the order of changes to the object.

Diagram 1 in FIG. 2 illustrates an example of the Lamport clock algorithm for two nodes in the shared database system. In this example, Node 1 starts a transaction (201) and performs an insert operation into the "courses" table (202), and the page where the data is inserted is assigned the current VTS at Node 1 (VTS=19). Node 2 also starts a transaction (202) to perform an insert operation into the same "courses" table (203). Reading the data page after Node 1's insert also reads the VTS=19, and Node 2 increments its local VTS to at least this value, plus 1, for the next insert (VTS=20). When the transaction in Node 1 commits, the VTS=20 (204). When the transaction in Node 2 commits, the VTS=21 (204). During a recovery process, the operations in the log records are applied in sequence according to the VTS's of the log records, and thus the operations would be applied in the correct order.

The Lamport clock algorithm works well for operations on objects that are shared and correctly orders the operations in the log records from a plurality of nodes. However, the Lamport clock algorithm does not work well for logically dependent operations which do not share a database object. This is demonstrated in Diagram 2 in FIG. 2.

In the example in Diagram 2, Node 1 starts a transaction (250) to insert the course 'csc457', 'computability and complexity' into the "courses" table (251) when its local VTS=19. Node 2 also starts a transaction (251) when its local VTS=1. The transaction by Node 2 includes inserting a student 'keri' into the "students" table (252) when its local VTS=2, and inserting 'csc457' as a course that 'keri' is taking into the "courseStudents" table (253) when its local VTS=3. Although in these operations, Nodes 1 and 2 do not perform operations on the same table, the order in which these operations are performed is important. Before a student can be inserted as taking a particular course, the course must first be inserted into the "courses" table. These operations by Nodes 1 and 2 are thus logically dependent. Before the transaction at Node 2 commits, other activities (254) at Node 1 causes increases to its local VTS so that when the transaction commits, the VTS at Node 1=1000 (255). Then, the transaction at Node 2 commits (256) when its local VTS=4. Although the transaction at Node 1 is committed prior to the transaction at Node 2, the VTS's fail to reflect this order. This is due to the fact that, although the transactions at Nodes 1 and 2 are logically dependent operations, they do not pertain to the same table. Since they do not pertain to the same table, the VTS's are not exchanged between Nodes 1 and 2, and thus are not synchronized.

Another example of the limitations of the Lamport clock algorithm includes a single logical stream of transactions where successive transactions in the stream may be routed to different nodes in the shared database system for load balancing purposes. In this example, there would be no inherent need for data to be transmitted between the different nodes running the different transactions, and therefore no opportunity for a Lamport clock VTS to be synchronized. Therefore, two transactions that are executed in a given order during run time may be replayed at recovery time in a different order.

An embodiment of the present invention provides the proper ordering of events for logically dependent operations that do not share a database object through the use of a global sequence number. In this specification, the global sequence number is termed "Log Flush Sequence" number or LFS number, and the providing of the global sequence number is termed an "LFS service". The LFS service leverages that fact that no event occurring on a first node can be externally observed to occur before a different event in a second node unless the log record associated with the first event was written to persistent storage 121 before the event on the second node begins. For example, to modify any object in the database 120, a node 102 must write a log record 117 first to its local buffer 114. To update the same object on another node 103, the object must first be transferred to node 103. This transfer requires that the log record 117 associated with the first update at node 102 be flushed to persistent storage 121 before the modification by node 103 begins.

The LFS service provides a unique, monotonically increasing sequence number upon request from any node in the shared database system. Requesting of an LFS occurs whenever a log flush is to occur to write locally stored log records at a node into persistent storage. Thus, the requesting of an LFS is only necessary to ensure that externally observable ordering of events is preserved. Any of the nodes 102-104 in the shared database system may function as an LFS server to provide the LFS service. The LFS server receives requests for a LFS number from any of the nodes in the cluster and returns a current LFS number to the requesting node.

Figure 3:
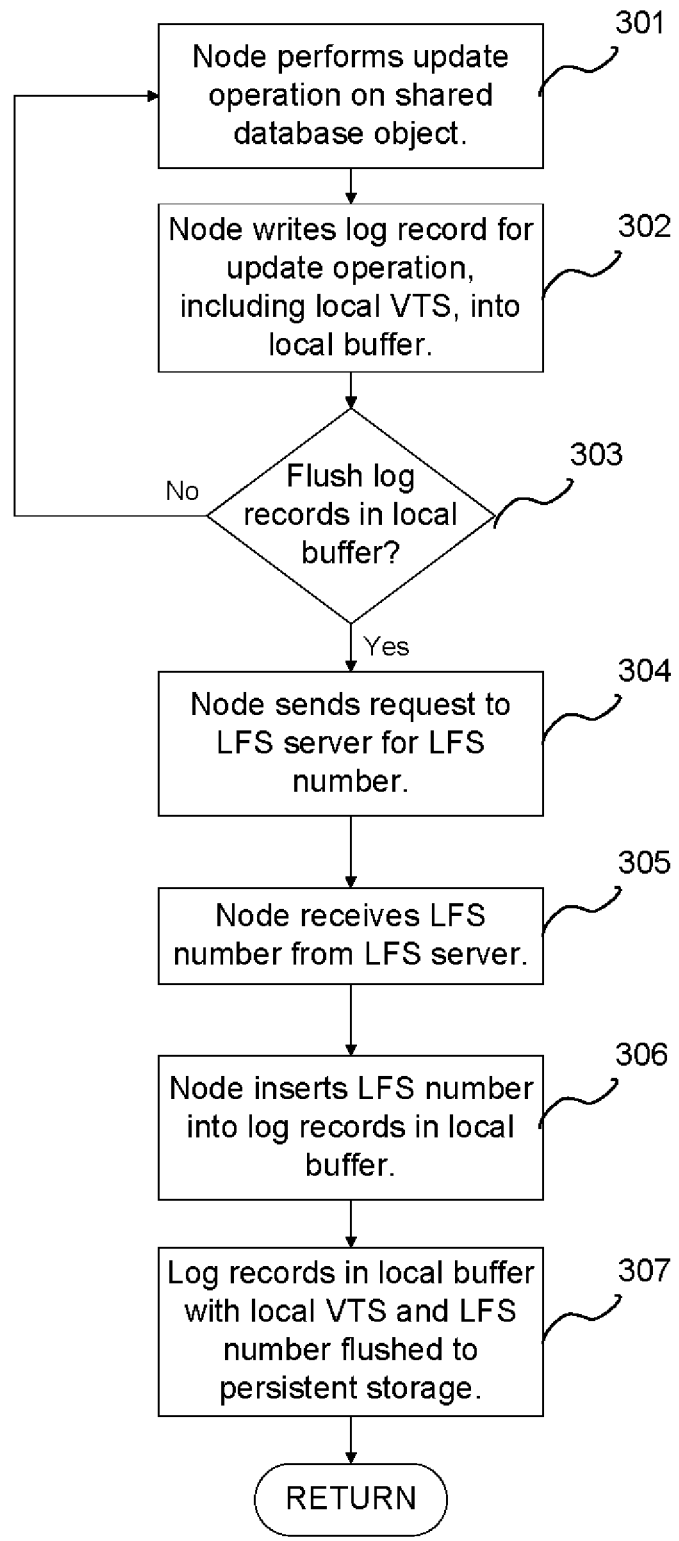
FIG. 3 is a flowchart illustrating an embodiment of a method for providing the log flush sequence service according to the present invention.

FIG. 3 is a flowchart illustrating an embodiment of a method for providing the LFS service according to the present invention. When a node, such as node 104, performs an update operation on a shared database object (301), the node 104 writes a log record 119 for the update operation, including a local VTS, into its local buffer 116 (302). Whenever node 104 is to flush the log records 119 in the local buffer 116 (303), node 104 sends a request to the LFS server 102 for a LFS number (304). The LFS server 102 receives the request and responds with the current LFS number. The LFS server 102 then increments the current LFS number. The node 104 receives the LFS number from the LFS server 102 (305), and inserts the LFS number into the log record 119 in the local buffer 116 (306). The log records 119 in the local buffer 116 with the local VTS's and the LFS number are flushed to persistent storage 121 (307), where they are merged with log records from other nodes. Note that since a log flush typically flushes multiple log records to persistent storage using a single I/O operation, the cost of obtaining a LFS number is amortized among all of the log records written out in the single I/O operation.

FIG. 4 illustrates the example of Diagram 2 (in FIG. 2), using the LFS number. Node 1 starts a transaction (401) to insert course 'csc457', 'computability and complexity' into the "courses" table (402) when its local VTS=1. Node 2 also starts a transaction (402) when its local VTS=1. The transaction by Node 2 includes inserting a student 'keri' into the "students" table (403) when its local VTS=2. In the meantime, other activities (404) at host computer 1 cause increases to its local VTS so that when the transaction commits, the VTS at Node 1=1000 (405). Nodes 1 and 2 each write log records into their respective local buffers for the operations, including the local VTS's. After the commit at Node 1, Node 1 performs a log flush. During this log flush, Node 1 sends a request to the LFS server 102 for the LFS number. Assume that Node 1 receives LFS=1 from the LFS server 102, and Node 1 inserts LFS=1 into the log records in its local buffer. After returning LFS=1 to Node 1, the LFS server 102 increments the LFS=2. Then, Node 2 inserts 'csc457' as a course that 'keri' is taking into the "courseStudents" table (406) when its local VTS=3. The transaction at Node 2 commits (407) when its local VTS=4. When Node 2 performs a log flush, Node 2 sends a request to the LFS server 102 for the LFS number. Assume that Node 2 receives LFS=2 from the LFS server 102, and Node 2 inserts LFS=2 into the log records in its local buffer. The log records for Nodes 1 and 2 thus include log records with their respective local VTS's as well as the global LFS numbers. The global LFS numbers orders the commits globally, while the VTS's order the operations within the same global LFS number. In this manner, although Nodes 1 and 2 do not perform operations on the same table, the transactions are ordered correctly for replay during a recovery process.

In this embodiment of the present invention, additional log records that are gathered on a node after the node has requested an LFS number from the LFS server are not associated with the LFS number. Otherwise, an erroneous ordering may result. For example, assume the following events: (1) Node A requests an LFS number and is given LFS=5; (2) Node B requests an LFS number and is given LFS=6; (3) Transaction 1 commits on Node A, and it is included in flush 6; and (4) Transaction 2 commits on Node B, and it is included in flush 5. In this example, Transaction 1 completes after Transaction 2. However, if Transaction 2 is assigned the LFS=6 received prior to the commit, the LFS numbers would erroneously indicate that Transaction 2 completed after Transaction 1.

Figure 5:
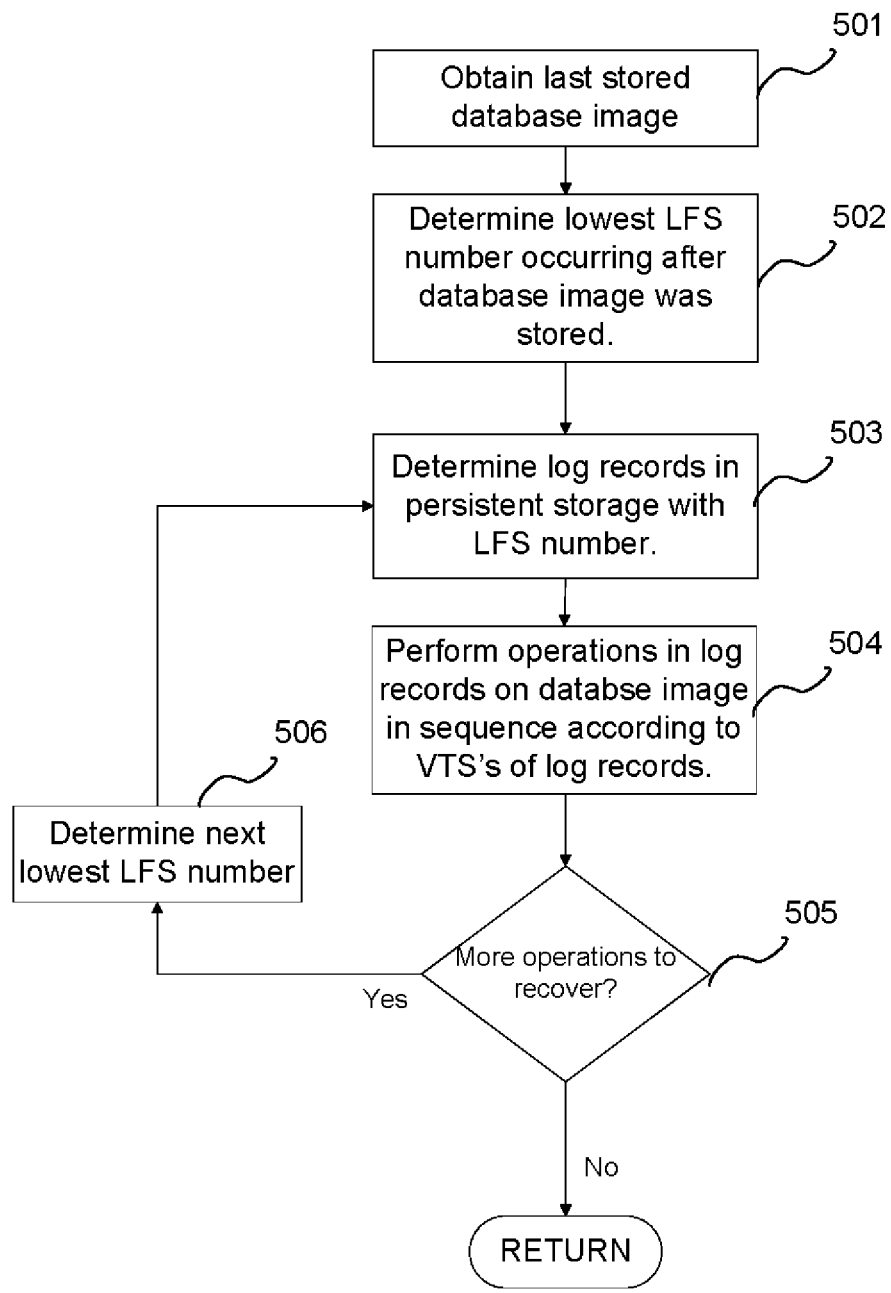
FIG. 5 is a flowchart illustrating an embodiment of a recovery process using the log flush sequence service of the present invention.

FIG. 5 is a flowchart illustrating an embodiment of a recovery process using the LFS service of the present invention. When a database crashes and a recovery process begins, the last stored database image is obtained (501). The operations that occurred on the database after the database image was stored are then performed on the database image. In performing these operations, the lowest LFS number occurring after the database image was stored is determined (502). The log records in persistent storage 121 with the LFS number are determined (503). The operations in these log records are then performed on the database image in an order according to the VTS's of the log records (504). As long as more operations are to be performed on the database image, the next lowest LFS number is determined (506), and the process (503-505) repeats.

Returning to the example in FIG. 4, assume that the two illustrated transactions are to be recovered. The log records in persistent storage 121 with LFS=1 are determined (503). In this example, the operations include the insert into the "courses" table with VTS=1, the commit with a VTS=1000, and other activities in-between. These operations are then performed in sequence according to the VTS's of the log records (504). Thus, the insert into the "courses" table (402), the commit (405), and the activities in-between (404) are performed in order. The LFS number is then incremented to LFS=2 (506). The log records in persistent storage 121 with LFS=2 are determined (503). In this example, the operations include the insert into the "students" table (403), the insert into the "courseStudents" table (406), and the commit (407). These operations are then performed in an order according to the VTS's of the log records (504). As illustrated, although the commit at Node 1 has a higher VTS number than the insert into the "courseStudents" table and the commit at Node 2, the operations on Node 1 are performed first based on the LFS numbers of the log records. In this manner, the operations are performed in the correct order during the recovery process.

In an alternative embodiment of the present invention, instead of recording the LFS in every log record by a node, the LFS may be recorded only in a single location associated with all the log records in a given log flush (e.g., in a single log page header), saving storage space.

In another alternative embodiment of the present invention, an efficient protocol may be implemented to duplex the LFS information in a standby or secondary LFS server. Any of the nodes, such as node 103, may function as the standby LFS server. In an embodiment of this protocol, an LFS is recorded at the standby LFS server 103 periodically, rather than after each increment of the LFS at the primary LFS server 102, thereby minimizing communication overhead. For example, the primary LFS server 102 may only record an LFS number to the standby LFS server 103 after issuing 1000 LFS numbers. The message the primary LFS server 102 sends to the standby LFS server 103 at this time instructs the standby LFS server 103 to record an LFS of least 2000. When the primary LFS server 102 reaches LFS=2000, the primary LFS server 102 sends another message to the standby LFS server 103 to ensure that the secondary LFS server 103 is now recording at least LFS=3000. This protocol ensures that if the primary LFS server 102 fails, the standby LFS server 103 can take over while preserving the monotonically increasing property of the LFS, without significantly impacting performance.

What is claimed is:

1. A method for ordering operations in log records in a shared database system, comprising:

maintaining a proper ordering for a database recovery process for logically dependent operations that do not share database objects by:

performing one or more first update operations of a first transaction on a first database object in a first table by a first node of a plurality of nodes in the shared database system;

writing one or more first log records for the first update operations into a first local buffer of the first node, the log first records comprising first local virtual timestamps indicating an order of the first update operations;

in response to determining that a first log flush to write the first log records in the first local buffer to a global persistent storage shared by the plurality of nodes is to be performed, obtaining from a log flush sequence server a first global log flush sequence number to correspond to the first log flush;

inserting the first global log flush sequence number into the first log records;

performing the first log flush to write the first log records in the first local buffer to the global persistent storage, wherein the first log records written to the global persistent storage comprise the first local virtual timestamps and the first global log flush sequence number;

performing one or more second update operations of a second transaction on a second database object in a second table by a second node of the plurality of nodes, wherein the first transaction is required to be committed by the first node before the second transaction is performed by the second node because the second transaction is logically dependent on the first transaction and the first database object is different than the second database object;

writing one or more second log records for the second update operations into a second local buffer of the second node, the second log records comprising second local virtual timestamps indicating an order of the second update operations, wherein the first and the second local virtual timestamps do not reflect a required commit order for the first and the second transactions;

in response to determining that a second log flush to write the second log records to the global persistent storage is to be performed, obtaining from the log flush sequence server a second global log flush sequence number to correspond to the second log flush;

inserting the second global log flush sequence number into the second log records;

performing the second log flush to write the second log records in the second local buffer to the global persistent storage, wherein the second log records written to the global persistent storage comprise the second local virtual timestamps and the second global log flush sequence number; and merging the second log records with the first log records in the global persistent storage, wherein the first global log flush sequence number and the second global log flush sequence number indicate a commit order of the first and the second transactions.

2. The method of claim 1, further comprising:

determining that the database recovery process is to be performed;

in response to determining that the database recovery process is to be performed, obtaining a last stored database image;

determining a lowest global log flush sequence number occurring after the database image was stored;

determining log records in the global persistent storage comprising the lowest global log flush sequence number, the determined log records comprising the lowest global log flush sequence number further comprising associated local virtual timestamps; and performing operations in the log records comprising the lowest global log flush sequence number in an order according to the associated local virtual timestamps.

3. The method of claim 2, further comprising:

determining a next lowest global log flush sequence number;

determining a second set of log records in the global persistent storage comprising the next lowest global log flush sequence number, the second set of log records further comprising a second set of associated local virtual timestamps; and performing operations in the second set of log records comprising the next lowest global log flush sequence number in an order according to the second set of associated local virtual timestamps.

4. The method of claim 1, wherein the inserting the first global log flush sequence number into the first log records comprises:

inserting the first global log flush sequence number into each of the first log records in the first local buffer.

5. The method of claim 1, wherein the inserting the first global log flush sequence number into the first log records comprises:

inserting the first global log flush sequence number into a single location associated with all of the first log records in the first local buffer.

6. A computer program product for ordering operations in log records in a shared database system, the computer program product comprising:

a computer readable storage device having computer readable program code embodied therewith, computer readable program code configured to:

maintain a proper ordering for a database recovery process for logically dependent operations that do not share database objects by:

performing one or more first update operations on a first database object in a first table by a first node of a plurality of nodes in the shared database system;

writing one or more first log records for the first update operations into a first local buffer of the first node, the first log records comprising first local virtual timestamps indicating an order of the first update operations;

in response to determining that a first log flush to write the first log records in the first local buffer to a global persistent storage is to be performed, obtaining from a global log flush sequence server a first log flush sequence number to correspond to the first log flush;

inserting the first global log flush sequence number into the first log records; and performing the first log flush to write the first log records in the first local buffer to the global persistent storage, wherein the first log records written to the global persistent storage comprise the first local virtual timestamps and the first global log flush sequence number;

performing one or more second update operations of a second transaction on a second database object in a second table by a second node of the plurality of nodes, wherein the first transaction is required to be committed by the first node before the second transaction is performed by the second node because the second transaction is logically dependent on the first transaction and the first database object is different than the second database object;

writing one or more second log records for the second update operations into a second local buffer of the second node, the second log records comprising second local virtual timestamps indicating an order of the second update operations, wherein the first and the second local virtual timestamps do not reflect a required commit order for the first and the second transactions;

in response to determining that a second log flush to write the second log records to the global persistent storage is to be performed, obtaining from the log flush sequence server a second global log flush sequence number to correspond to the second log flush;

inserting the second global log flush sequence number into the second log records;

performing the second log flush to write the second log records in the second local buffer to the global persistent storage, wherein the second log records written to the global persistent storage comprise the second local virtual timestamps and the second global log flush sequence number; and merging the second log records with the first log records in the global persistent storage, wherein the first global log flush sequence number and the second global log flush sequence number indicate a commit order of the first and the second transactions.

7. The product of claim 6, wherein the computer readable program code is further configured to:
   determine that the database recovery process is to be performed;
   in response to determining that the database recovery process is to be performed, obtain a last stored database image;
   determine a lowest global log flush sequence number occurring after the database image was stored;
   determine log records in the global persistent storage comprising the lowest global log flush sequence number, the determined log records comprising the lowest global log flush sequence number further comprising associated local virtual timestamps; and
   perform operations in the log records comprising the lowest global log flush sequence number in an order according to the associated local virtual timestamps.

8. The product of claim 7, wherein the computer readable program code is further configured to:
   determine a next lowest global log flush sequence number;
   determine a second set of log records in the global persistent storage comprising the next lowest global log flush sequence number, the second set of log records further comprising a second set of associated local virtual timestamps; and
   perform operations in the second set of log records comprising the next lowest global log flush sequence number in an order according to the second set of associated local virtual timestamps.

9. The product of claim 6, wherein the computer readable program code configured to insert the first global log flush sequence number into the first log records is further configured to:
   insert the first global log flush sequence number into each of the first log records in the first local buffer.

10. The product of claim 6, wherein the computer readable program code configured to insert the first global log flush sequence number into the first log records is further configured to:
    insert the first global log flush sequence number into a single location associated with all of the first log records in the first local buffer.

11. A system, comprising:
    a global persistent storage;
    a log flush sequence server; and
    a first node of a plurality of nodes of a shared database system, the first node comprising a first local buffer and a first computer readable storage medium having computer readable program code embodied therewith, the first computer readable program code configured to:
    maintain a proper ordering for a database recovery process for logically dependent operations that do not share database objects by:
    performing one or more first update operations on a first database object in a first table by the first node;
    writing one or more first log records for the first update operations into the first local buffer of the first node, the first log records comprising first local virtual timestamps indicating an order of the first update operations;
    in response to determining that a first log flush to write the first log records in the first local buffer to the global persistent storage shared by the plurality of nodes is to be performed, obtaining from the log flush sequence server a first global log flush sequence number to correspond to the first log flush;
    inserting the first global log flush sequence number into the first log records; and
    performing the first log flush to write the first log records in the first local buffer to the global persistent storage, wherein the first log records written to the global persistent storage comprise the first local virtual timestamps and the first global log flush sequence number;
    performing one or more second update operations of a second transaction on a second database object in a second table by a second node of the plurality of nodes, wherein the first transaction is required to be committed by the first node before the second transaction is performed by the second node because the second transaction is logically dependent on the first transaction and the first database object is different than the second database object;
    writing one or more second log records for the second update operations into a second local buffer of the second node, the second log records comprising second local virtual timestamps indicating an order of the second update operations, wherein the first and the second local virtual timestamps do not reflect a required commit order for the first and the second transactions;
    in response to determining that a second log flush to write the second log records to the global persistent storage is to be performed, obtaining from the log flush sequence server a second global log flush sequence number to correspond to the second log flush;
    inserting the second global log flush sequence number into the second log records;
    performing the second log flush to write the second log records in the second local buffer to the global persistent storage, wherein the second log records written to the global persistent storage comprise the second local virtual timestamps and the second global log flush sequence number; and
    merging the second log records with the first log records in the global persistent storage, wherein the first global log flush sequence number and the second global log flush sequence number indicate a commit order of the first and the second transactions.

12. The system of claim 11, wherein the computer readable program code is further configured to:
    determine that the database recovery process is to be performed;
    in response to determining that the database recovery process is to be performed, obtain a last stored database image;
    determine a lowest global log flush sequence number occurring after the database image was stored;
    determine log records in the global persistent storage comprising the lowest global log flush sequence number, the determined log records comprising the lowest global log flush sequence number further comprising associated local virtual timestamps; and
    perform operations in the log records comprising the lowest global log flush sequence number in an order according to the associated local virtual timestamps.

13. The system of claim 12, wherein the computer readable program code is further configured to:
- determine a next lowest global log flush sequence number;
- determine a second set of log records in the global persistent storage comprising the next lowest global log flush sequence number, the second set of log records further comprising a second set of associated local virtual timestamps; and
- perform operations in the second set of log records comprising the next lowest global log flush sequence number in an order according to the second set of associated local virtual timestamps.

14. The system of claim 11, wherein the computer readable program code configured to insert the first global log flush sequence number into the first log records is further configured to:
- insert the first global log flush sequence number into each of the first log records in the first local buffer.

15. The system of claim 11, wherein the computer readable program code configured to insert the first global log flush sequence number into the first log records is further configured to:
- insert the first global log flush sequence number into a single location associated with all of the first log records in the first local buffer.

16. A method for recovering operations from log records in a shared database system, comprising:
- determining that a database recovery process is to be performed for the shared database system wherein a proper ordering for the database recovery process is maintained for logically dependent operations that do not share database objects;
- in response to determining that the database recovery process is to be performed, obtaining a last stored database image;
- determining a lowest global log flush sequence number occurring after the database image was stored;
- determining one or more first log records in a global persistent storage shared by a plurality of nodes comprising the lowest global log flush sequence number, wherein the lowest global log flush sequence number was assigned to correspond to a first log flush from a first local buffer of a first node of a plurality of nodes in the shared database system to the global persistent storage, the first log records further comprising first virtual timestamps local to the first node and corresponding to first operations of a first transaction performed on a first database object in a first table by the first node, wherein the first virtual timestamps indicate an order of the first operations;
- performing the first operations in the first log records in an order according to the first virtual timestamps;
- after performing the first operations, determining a next lowest global log flush sequence number;
- determining one or more second log records in the global persistent storage comprising the next lowest global log flush sequence number, wherein the next lowest global log flush sequence number was assigned to correspond to a second log flush from a second local buffer of a second node of the plurality of nodes to the global persistent storage, the second log records further comprising second virtual timestamps local to the second node and corresponding to second operations of a second transaction performed on a second database object in a second table by the second node, wherein the second virtual timestamps indicate an order of the second operations; and
- performing the second operations in the second log records in an order according to the second virtual timestamps,
- wherein the first transaction is required to be committed before the second transaction is performed because the second transaction is logically dependent on the first transaction and the first database object is different than the second database object, wherein the first virtual timestamps and the second virtual timestamps do not reflect a commit order for the first and the second transactions, wherein the lowest global log flush sequence number and the next lowest global log flush sequence number indicate the commit order of the first and second transactions.

17. The method of claim 1, wherein the first transaction on the first database object in the first table by the first node is not observable by the second node until the first records are written to the global persistent storage.

18. The product of claim 6, wherein the first transaction on the first database object in the first table by the first node is not observable by the second node until the first records are written to the global persistent storage.

19. The system of claim 11, wherein the first transaction on the first database object in the first table by the first node is not observable by the second node until the first records are written to the global persistent storage.

20. The method of claim 16, wherein the first transaction on the first database object in the first table by the first node was not observable by the second node until the first records are written to the global persistent storage.

* * * * *